July 8, 1941.  W. FERRANT  2,248,614
VACUUM MEASURING DEVICE
Filed Feb. 26, 1938
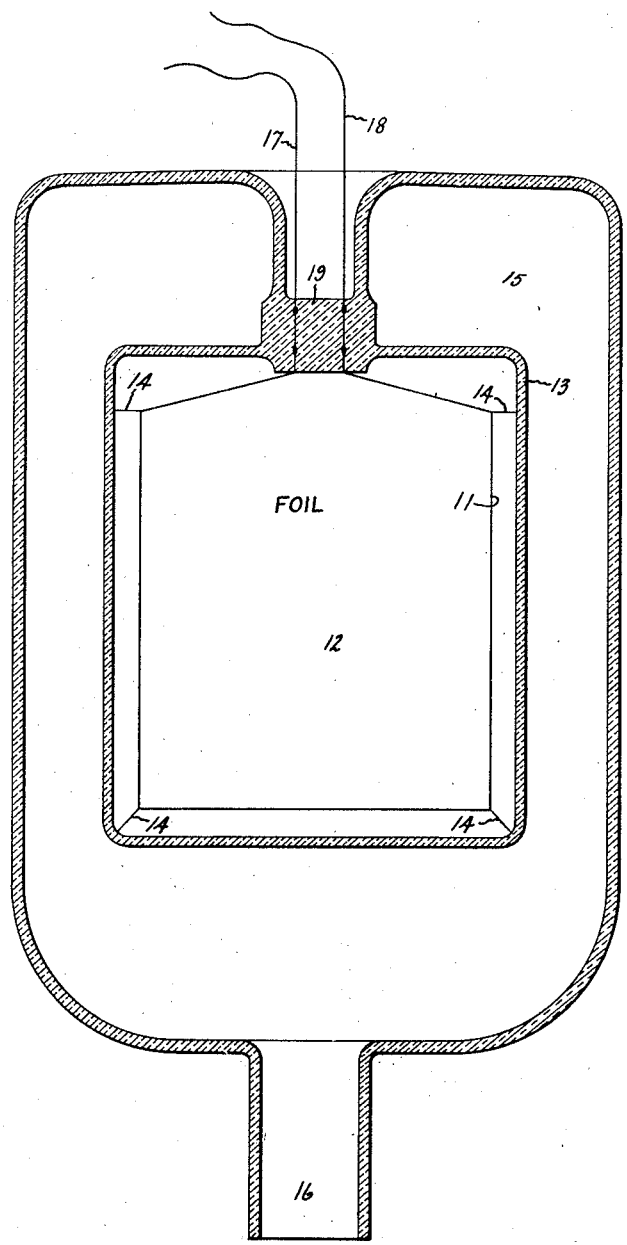
Inventor:
Wolfgang Ferrant,
by Harry E. Dunham
His Attorney.

Patented July 8, 1941

2,248,614

UNITED STATES PATENT OFFICE 2,248,614

VACUUM MEASURING DEVICE

Wolfgang Ferrant, Berlin-Reinickendorf, Germany, assignor to General Electric Company, a corporation of New York Application February 26, 1938, Serial No. 192,858
In Germany April 12, 1937

7 Claims. (Cl. 201—63)

My invention relates to vacuum measuring devices and concerns particularly apparatus of the hot resistance wire type.

It is an object of my invention to provide an improved vacuum measuring element of increased ruggedness and sensitivity and it is also an object of my invention to provide an improved method of producing vacuum measuring elements of the resistance type.

Other and further objects and advantages will become apparent as the description proceeds.

It is frequently desirable to have vacuum measuring instruments which are capable of withstanding inrushes of air. For such purposes measuring instruments of the Pirani type may be employed consisting of an electrically heated wire placed in a vacuum to be measured and electrically connected in a Wheatstone bridge circuit or other suitable type of electrical circuit responsive to variations in resistance. Such instruments are insufficiently sensitive, however, in the case of very low pressure such as pressure below $\frac{1}{10000}$ of a millimeter of mercury, for example, which must often be measured in engineering practice. It is an object of my invention accordingly, to provide a resistance type of vacuum measuring instrument in which increased sensitivity is obtained to the extent of increasing the measuring range by about two orders of magnitude.

In carrying out my invention in its preferred form I utilize a wire thermally connected to a foil or to a film of material which is as thin as possible and which passes both heat rays and light rays, that is, which passes radiant energy of all wave lengths. In this manner the ratio of heat emission by molecular impacts upon the film to heat emission by radiation is increased.

My invention may be understood more readily from the following detailed description when considered in connection with the accompanying drawing and those features of the invention which are believed to be novel and patentable will be pointed out in the claims appended hereto. The sole figure of the drawing is an elevation partially in section of a vacuum measuring element constituting one embodiment of my invention.

In the drawing I have shown a resistance wire 11 in the form of a loop, the sides of which are joined by a film 12 which is in thermal connection with the wire 11 so that heat flows between the wire and the film to equalize the temperature thereof. The wire 11 may be supported in a frame 13 of glass or other suitable material by metal or quartz threads 14. The entire unit is enclosed within a chamber or envelope 15 composed of glass or other suitable material having an opening 16 communicating with the space in which vacuum is to be measured and having lead wires 17 and 18 sealed through the wall of the envelope 15 at 19 and electrically connected to the ends of the wire 11.

It will be understood that vacuum measuring instruments of the heated resistance wire type operate on the principle that as the pressure of the gaseous medium or the degree of vacuum varies in the chamber in which the wire is located the rate of heat dissipation from the wire and its temperature vary owing to the varying amount of heat carried away by the gas or air in the chamber. In such electrical measuring instruments, therefore, the wire such as a wire 11 is connected to an electrical circuit (not shown) which causes heating current to flow through it, and the variations in resistance are measured by means of a bridge connection or other suitable type of electrical connection in order to detect variations in the temperature of the wire. In the arrangement which I have shown, the effect of pressure or vacuum variations is greatly magnified by reason of the film 12 joining the sides of the wire loop 11, thus greatly increasing the surface of the element with respect to its volume and making its temperature more sensitive to variations in the vacuum. I make the film 12 as thin as possible and make the surface area of the entire unit as large as possible with respect to the volume.

I have found various satisfactory ways of forming the combined unit consisting of the wire 11 and the film 12. Preferably, however, the material of which the film is composed should be highly permeable to radiant energy such as heat rays and light rays and of such a character that it does not needlessly diminish the reflecting power through collection of dust or surface roughness. For example, very thin quartz sheets or films, cellulose varnish films, or silver chloride films may be used. Such films may be produced on the wire loop, if desired, in the manner in which soap films are produced, viz; by immersing the wire loop in a liquid which solidifies later, such as cellulose varnish or molten silver chloride.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to obtain by Letters Patent of the United States is:

1. In a vacuum measuring instrument of the type in which variations in absolute pressure of the surrounding medium vary the heat dissipation by convection from a heated surface, and thereby vary its temperature, a resistance wire sensitive to variations in pressure of the surrounding gaseous medium, said wire being adapted to be connected to a source of heating current, having a resistance varying with its temperature and having the form of a loop, the sides of which are bridged over by a film of electrically non-conducting material secured to the wire and making thermal contact therewith, whereby the effective heat dissipating surface of the wire is increased.

2. In a vacuum measuring instrument of the type in which variations in absolute pressure of the surrounding medium vary the heat dissipation by convection from a heated surface, and thereby vary its temperature, a resistance wire, the variations in resistance of which are responsive to variations in pressure of the surrounding gaseous medium, said wire being adapted to be connected to a source of heating current, having a resistance varying with temperature and having a film of electrically non-conducting material secured thereto and making thermal contact therewith, whereby the effective heat dissipating surface of the wire is increased.

3. In a vacuum measuring instrument of the type in which variations in absolute pressure of the surrounding medium vary the heat dissipation by convection from a heated source, and thereby vary its temperature, a resistance wire, the variations in resistance of which are responsive to variations in pressure of the surrounding gaseous medium, said wire being adapted to be connected to a source of heating current, having a resistance varying with temperature and having a film secured thereto and making thermal contact therewith for increasing the effective heat dissipating surface of the wire and composed of material highly permeable to radiant heat to increase the ratio of heat emission by molecular impacts upon the film to heat emission by radiation.

4. A vacuum measuring instrument comprising a vacuum chamber, a resistance wire therein for detecting variations in pressure of the surrounding gaseous medium by the effect of pressure variations on the heat dissipation from the wire by convection and the consequent effect on the temperature of the wire, leads extending through a wall of the chamber and connected to the wire, and a film of electrically non-conducting material secured to the wire and making thermal contact therewith for increasing the effective heat dissipating surface of the wire, said leads being adapted to be connected to a source of heating current and said wire being composed of a material varying in resistance with variations in temperature.

5. In a vacuum measuring instrument of the type in which variations in pressure of the surrounding medium vary the heat dissipation by convection from a heated surface, and thereby vary its temperature, a resistance wire sensitive to variations in pressure of the surrounding gaseous medium with a film of quartz secured thereto in thermal contact therewith to increase the effective heat dissipating surface of the wire, and means for connecting the resistance wire to a source of heating current, said wire being composed of a material varying in resistance with variations in temperature.

6. In a vacuum measuring instrument of the type in which variations in pressure of the surrounding medium vary the heat dissipation by convection from a heated surface, and thereby vary its temperature, a resistance wire sensitive to variations in pressure of the surrounding gaseous medium with a film of fused silver chloride secured thereto in thermal contact therewith to increase the effective heat dissipating surface of the wire, and means for connecting the resistance wire to a source of heating current, said wire being composed of a material varying in resistance with variations in temperature.

7. In a vacuum measuring instrument of the type in which variations in absolute pressure of the surrounding medium vary the heat dissipation by convection from a heated surface, and thereby vary its temperature, a resistance wire sensitive to variations in presssure of the surrounding gaseous medium with a film of cellulose varnish secured thereto in thermal contact therewith to increase the effective heat dissipating surface of the wire, and means for connecting the resistance wire to a source of heating current, said wire being composed of a material varying in resistance with variations in temperature.

WOLFGANG FERRANT.